(12) United States Patent
Tanaya et al.

(10) Patent No.: US 11,575,645 B2
(45) Date of Patent: Feb. 7, 2023

(54) LDAP QUERY OPTIMIZATION WITH SMART INDEX SELECTION

(71) Applicant: Oracle International Corporation, Redwood Shores, CA (US)

(72) Inventors: Hitaisinee Himadri Tanaya, Bangalore (IN); Lutfiye Umit Yalcinalp, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 230 days.

(21) Appl. No.: 16/204,525

(22) Filed: Nov. 29, 2018

(65) Prior Publication Data

US 2019/0334857 A1    Oct. 31, 2019

(30) Foreign Application Priority Data

Apr. 28, 2018 (IN) .............................. 201841016108

(51) Int. Cl.
*H04L 61/45* (2022.01)
*H04L 61/4523* (2022.01)
*G06F 16/903* (2019.01)
*G06F 16/31* (2019.01)
*G06F 16/335* (2019.01)
*G06F 16/84* (2019.01)

(52) U.S. Cl.
CPC ........ *H04L 61/4523* (2022.05); *G06F 16/313* (2019.01); *G06F 16/322* (2019.01); *G06F 16/335* (2019.01); *G06F 16/86* (2019.01); *G06F 16/90348* (2019.01)

(58) Field of Classification Search
None
See application file for complete search history.

(56) References Cited

U.S. PATENT DOCUMENTS 6,609,121 B1 * 8/2003 Ambrosini ............ G06F 16/282
                                                                707/763
7,233,944 B2   6/2007 Ahmed
7,702,627 B2   4/2010 Ahmed et al.
7,945,562 B2   5/2011 Ahmed et al.
(Continued)

OTHER PUBLICATIONS

U.S. Appl. No. 16/204,433 received a Non-Final Office Action dated Jun. 26, 2020, 8 pages.
(Continued)

*Primary Examiner* — Alford W Kindred
*Assistant Examiner* — Cao D Vuong
(74) *Attorney, Agent, or Firm* — Kilpatrick Townsend & Stockton LLP

(57) ABSTRACT

The present disclosure relates generally to Lightweight Directory Access Protocol (LDAP), and more particularly, to techniques for improving query performance on an LDAP server. One particular technique includes receiving a LDAP query having search criteria, identifying one or more search filters within the search criteria, determining candidate indices based on the identified one or more search filters, evaluating the candidate indices based on statistics collected for the candidate indices, selecting one or more indices from the candidate indices based on the evaluating, and executing the LDAP query on an LDAP directory using the selected one or more indices.

11 Claims, 8 Drawing Sheets

(56) References Cited

U.S. PATENT DOCUMENTS

| | | | |
|---|---|---|---|
| 8,260,769 B1* | 9/2012 | Fuller | G06F 16/335 |
| | | | 707/715 |
| 8,352,517 B2 | 1/2013 | Park et al. | |
| 9,424,326 B2* | 8/2016 | Baptist | G06F 16/178 |
| 9,483,455 B1 | 11/2016 | Bastide et al. | |
| 9,870,390 B2 | 1/2018 | Ahmed et al. | |
| 10,402,423 B2* | 9/2019 | Dhuse | G06F 16/134 |
| 10,437,843 B2 | 10/2019 | Nguyen et al. | |
| 10,664,508 B1 | 5/2020 | Laurence et al. | |
| 2004/0059719 A1* | 3/2004 | Gupta | H04L 61/1523 |
| 2004/0243576 A1 | 12/2004 | Shrivastava et al. | |
| 2008/0126297 A1* | 5/2008 | Rowley | G06F 16/24547 |
| 2008/0126435 A1* | 5/2008 | Rowley | G06F 16/2365 |
| 2009/0132479 A1 | 5/2009 | Manson et al. | |
| 2010/0250518 A1 | 9/2010 | Bruno et al. | |
| 2015/0066946 A1* | 3/2015 | Fuller | G06F 16/24539 |
| | | | 707/741 |
| 2015/0220583 A1 | 8/2015 | Teletia et al. | |
| 2017/0132286 A1 | 5/2017 | Baranczyk et al. | |
| 2018/0285416 A1 | 10/2018 | Bestfleisch | |

OTHER PUBLICATIONS

Cranshaw et al., Building a Scalable Event-Level Metadata Service for ATLAS, Journal of Physics Conference Series, vol. 119, No. 7, 2008, 11 pages.

U.S. Appl. No. 16/204,433, Notice of Allowance dated Oct. 9, 2020, 9 pages.

* cited by examiner

LDAP QUERY OPTIMIZATION WITH SMART INDEX SELECTION

CROSS-REFERENCE TO RELATED APPLICATION

The present application claims the benefit and priority of India Provisional Application No. 201841016108, filed Apr. 28, 2018 entitled "SYSTEMS AND METHODS FOR PERFORMING LDAP QUERIES," the entire contents of which are incorporated herein by reference for all purposes.

FIELD OF THE INVENTION

The present invention relates to Lightweight Directory Access Protocol (LDAP), and in particular to techniques for improving query performance on an LDAP server.

BACKGROUND

Lightweight Directory Access Protocol (LDAP) is a directory service protocol for enabling users to locate organizations, individuals, and other resources such as files and devices in a network, whether on the public Internet or on a corporate intranet. In a network, a directory service tells a user where in the network something is located. Directory services play an important role in developing intranet and Internet applications by allowing the sharing of information about users, systems, networks, services, and applications throughout the network. As examples, directory services may provide any organized set of records, often with a hierarchical structure, such as a corporate email directory. Similarly, a telephone directory may be presented as a list of subscribers with an address and a phone number.

LDAP is a commonly used technology for storing corporate users, groups and credentials within organizations, and allows a user to search for an individual without knowing where they're located (although additional information will help with the search). An LDAP directory is commonly organized in a hierarchical structure comprising one or more levels. The one or more levels may include a root directory (the starting place or the source of the tree), which may branch out to countries, each of which may branch out to organizations (divisions, departments, and so forth), which may branch out further to organizational units, which may branch out even further to individuals (which includes people, files, and shared resources such as printers). A user starts an LDAP session by connecting to an LDAP server, called a Directory System Agent (DSA). The user then sends an operation request to the server, and the server sends responses in return. Common operations that a user may request include: starting a secure connection, authenticate and specify an LDAP protocol version, queries for and/or retrieve directory entries, compare whether an entry has a given attribute, add a new entry, delete an entry, modify an entry, abandon a previous request, and unbind or close the connection.

Query operations that pertain to user and group look up constitute about 90% of the queries performed using LDAP, and the response time of the directory server replying to the query should be optimized especially when the system needs to provide quick access to directory data in order to meet access and authorization needs of enterprise and cloud applications. However, expensive or inefficient LDAP queries coming in from various client applications are typical problems for a directory server. Similar to relational database management system, deployments often look for techniques to improve query performance for commonly used queries based on their deployment data. Traditional relational databases make use of various techniques to improve query performance. However, such techniques are generally not applicable in LDAP. Therefore, techniques for improving query performance on an LDAP server continue to be a priority and are desired.

BRIEF SUMMARY

Systems, methods and computer-readable memory for improving query performance on an LDAP server are described. Certain techniques are described for intelligently selecting indices used to execute an LDAP query based on statistics that are representative of the underlying data.

In various embodiments, a method is provided that comprises receiving, by a data processing system, a Lightweight Directory Access Protocol (LDAP) query comprising search criteria; identifying, by the data processing system, one or more search filters within the search criteria; determining, by the data processing system, candidate indices based on the identified one or more search filters; evaluating, by the data processing system, the candidate indices based on statistics collected for the candidate indices; selecting, by the data processing system, one or more indices from the candidate indices based on the evaluating; and executing, by the data processing system, the LDAP query on an LDAP directory using the selected one or more indices.

In some embodiments, each of the candidate indices are a key value pair, where the key is an attribute value or substring value that is indexed, and the value is a list of entry IDs matching the attribute value or the substring value, and where the determining the candidate indices comprises identifying one or more attribute values or substring values in the one or more search filters and matching the one or more attribute values or substring values to the candidate indices.

In some embodiments, the method further comprises collecting, by the data processing system, the statistics for the candidate indices, where the statistics include an average value size, which is a calculated average total bytes of data or average count for a number of entries in the list of entry IDs matching the attribute value or the substring value.

In some embodiments, the method further comprises obtaining, by the data processing system, results for the LDAP query based on the executing the LDAP query, wherein the results include one or more entries from the LDAP directory; and forwarding, by the data processing system, the results to a client. In some embodiments, the method further comprises updating, by the data processing system, the statistics concerning the indices used to service the LDAP queries based on the results obtained for the LDAP query.

In some embodiments, the evaluating comprises: sorting the candidate indices based on the calculated average total bytes of data or the average count for each of the candidate indices; and comparing the candidate indices based on the calculated average total bytes of data or the average count for each of the candidate indices. Optionally, the candidate indices are sorted in ascending or descending order, and the selecting comprises selecting the one or more indices with the smallest calculated average total bytes of data or average count for each of the candidate indices.

In various embodiments, a system is provided that comprises a Lightweight Directory Access Protocol (LDAP) system that includes one or more processors and non-transitory machine readable storage medium having instructions stored thereon that when executed by the one or more processors cause the one or more processors to perform a process comprising: receiving, by a LDAP server, a LDAP query comprising search criteria; identifying, by the data processing system, one or more search filters within the search criteria; determining, by the LDAP server, candidate indices based on the identified one or more search filters; evaluating, by the LDAP server, the candidate indices based on statistics collected for the candidate indices; selecting, by the LDAP server, one or more indices from the candidate indices based on the evaluating; and executing, by the LDAP server, the LDAP query on an LDAP directory using the selected one or more indices.

In some embodiments, each of the candidate indices are a key value pair, where the key is an attribute value or substring value that is indexed, and the value is a list of entry IDs matching the attribute value or the substring value, and where the determining the candidate indices comprises identifying one or more attribute values or substring values in the one or more search filters and matching the one or more attribute values or substring values to the candidate indices.

In some embodiments, the process further comprises collecting, by the LDAP server, the statistics for the candidate indices, wherein the statistics include an average value size, which is a calculated average total bytes of data or average count for a number of entries in the list of entry IDs matching the attribute value or the substring value.

In some embodiments, the process further comprises: obtaining, by the LDAP server, results for the LDAP query based on the executing the LDAP query, wherein the results include one or more entries from the LDAP directory; and forwarding, by the LDAP server, the results to a client. In some embodiments, the process further comprises updating, by the LDAP server, the statistics concerning the indices used to service the LDAP queries based on the results obtained for the LDAP query.

In some embodiments, the evaluating comprises: sorting the candidate indices based on the calculated average total bytes of data or the average count for each of the candidate indices; and comparing the candidate indices based on the calculated average total bytes of data or the average count for each of the candidate indices. Optionally, the candidate indices are sorted in ascending or descending order, and the selecting comprises selecting the one or more indices with the smallest calculated average total bytes of data or average count for each of the candidate indices.

In various embodiments, a non-transitory machine readable storage medium having instructions stored thereon that when executed by one or more processors cause the one or more processors to perform a method comprising: receiving a Lightweight Directory Access Protocol (LDAP) query comprising search criteria; identifying one or more search filters within the search criteria; determining candidate indices based on the identified one or more search filters; evaluating the candidate indices based on statistics collected for the candidate indices; selecting one or more indices from the candidate indices based on the evaluating; and executing the LDAP query on an LDAP directory using the selected one or more indices.

In some embodiments, each of the candidate indices are a key value pair, where the key is an attribute value or substring value that is indexed, and the value is a list of entry IDs matching the attribute value or the substring value, and where the determining the candidate indices comprises identifying one or more attribute values or substring values in the one or more search filters and matching the one or more attribute values or substring values to the candidate indices.

In some embodiments, the method further comprises collecting the statistics for the candidate indices, wherein the statistics include an average value size, which is a calculated average total bytes of data or average count for a number of entries in the list of entry IDs matching the attribute value or the substring value.

In some embodiments, the process further comprises: obtaining results for the LDAP query based on the executing the LDAP query, wherein the results include one or more entries from the LDAP directory; forwarding the results to a client; and updating the statistics concerning the indices used to service the LDAP queries based on the results obtained for the LDAP query.

In some embodiments, the evaluating comprises: sorting the candidate indices based on the calculated average total bytes of data or the average count for each of the candidate indices; and comparing the candidate indices based on the calculated average total bytes of data or the average count for each of the candidate indices. Optionally, the candidate indices are sorted in ascending or descending order, and the selecting comprises selecting the one or more indices with the smallest calculated average total bytes of data or average count for each of the candidate indices.

DETAILED DESCRIPTION

Figure 1:
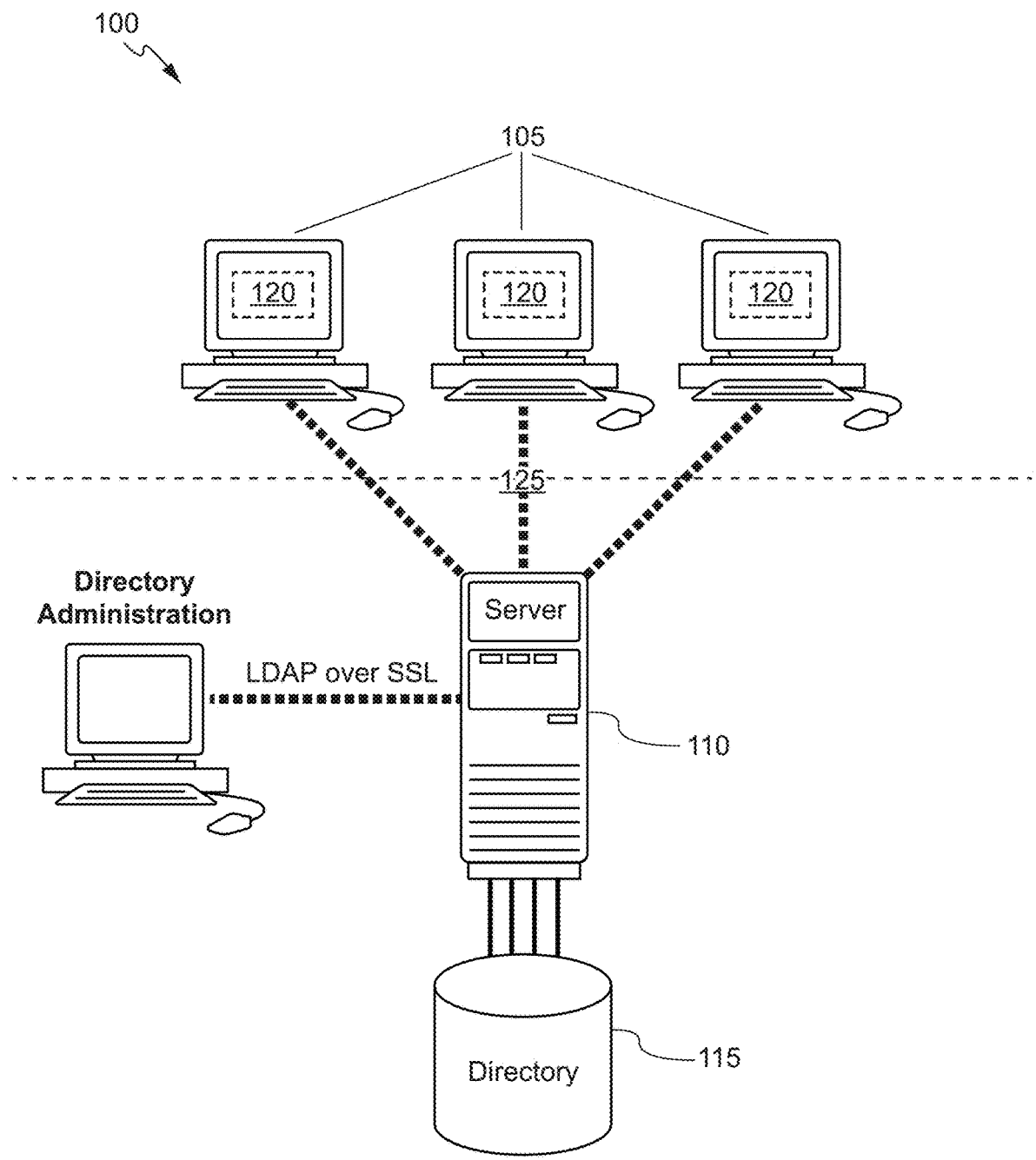
FIG. 1 shows a block diagram of an LDAP system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

A directory service is a customizable information store that functions as a single point from which users can locate resources and services distributed throughout a network, and is commonly the backbone of many organizations. LDAP is a service protocol used within a directory service to authenticate, search, and create/modify entities, typically corporate users, groups and application data. LDAP performance is important to a successful deployment of a directory service. Expensive or inefficient LDAP queries coming in from various client applications are typical problems for a directory server. For example, many times clients provide queries that are not written correctly and poor LDAP query performances are often attributed to the lack of intelligence in selecting the right index for a given query.

An index is a mechanism used by the LDAP directory server database that can be used to efficiently find entries matching search criteria. As used herein, an "index" maps to a subset of entries of all the entries in the LDAP directory, which allows searches or queries to be run on subsets of data in a more efficient manner. More specifically, each index maps a key (e.g., l=location1) to an ID list, which is the set of entry IDs for the entries (e.g., all entries with location1) that match that index key. Normally in LDAP there are three basic index types implemented: (i) equality or value indices are used to identify entries containing an attribute value that exactly matches a given assertion value, (ii) presence indices are used to identify entries that contain at least one value for a given attribute, and (iii) substring indices are used to identify entries that contain an attribute value matching a given substring assertion. The various LDAP server implementations may have other customizable indices such as approximate indices, extensible match indices, and ordering indices. Attributes hold the data for an entry. Each attribute has an attribute type, zero or more attribute options, and a set of values that comprise the actual data. Attribute types are schema elements that specify how attributes should be treated by LDAP clients and servers. All attribute types typically have an object identifier (OID) and zero or more names that can be used to reference attributes of that type. They may also have an attribute syntax, which specifies the type of data that can be stored in attributes of that type, and a set of matching rules, which indicate how comparisons should be performed against values of attributes of that type. Attribute types may also indicate whether an attribute is allowed to have multiple values in the same entry, and whether the attribute is intended for holding user data (a user attribute) or is used for the operation of the server (an operational attribute). Operational attributes are typically used for configuration and/or state information.

LDAP directory servers typically have their own built-in code logic to select the indices and execute underlying queries to fetch data from the storage layer based on received search criteria. Commonly the LDAP directory server selects the indices to use for a given query simply based on the filter(s) presented in the search criteria. Search filters are used to define criteria such as attributes or types of attributes for identifying entries that contain certain kinds of information. Thereafter, the LDAP directory executes the search operation on the directory using the selected indices in a sequential (e.g., based on the order of filters in the search criteria) or randomly (e.g., simply picking and choosing indices randomly without intelligence). However, this type of index selection and execution does not work well when more than one index needs to be selected and executed for a given query. For example, the LDAP directory servers typically select the indices in a sequential or random order for execution based on the filter(s) presented in the search criteria; however, some indices perform better first rather than last, some indices perform better last rather than first, some indices perform better after or before another index, etc. in an execution strategy. Consequently, it should be understood that intelligent selection of the indices in an execution strategy could improve query performance. Nonetheless, conventional solutions to improve query performance are not typically directed to improving the capability of the LDAP directory servers to select the right indices in an execution strategy for the received search criteria. Instead, conventional solutions rely on underlying database tuning techniques and local in-memory caching to achieve better query performance.

To address these problems and provide an improved system to intelligently select the indices for a given query, a method is provided comprising collecting, by a data processing system such as a directory server, statistics concerning indices used to service LDAP queries; receiving, by the data processing system, a LDAP query comprising search criteria; identifying, by the data processing system, one or more search filters within the search criteria; determining, by the data processing system, candidate indices from the indices based on the identified one or more search filters; using, by the data processing system, a comparator to sort the candidate indices based on the statistics; evaluating, by the data processing system, the candidate indices based on the comparator; selecting, by the data processing system, one or more indices from the candidate indices based on the evaluation; and executing, by the data processing system, the LDAP query on an LDAP directory using the selected one or more indices. As used herein, when an action is "triggered by" or "based on" something, this means the action is triggered or based at least in part on at least a part of the something. By implementing index statistic gathering within the directory server, the directory server can decide which indices would be optimal to use rather than choosing indices based simply on the incoming search filter. When there is a choice between multiple indices, query performance would be better when the index that finds the smallest number of entries is used. Advantageously, this new approach would improve query performance in large scale deployments since the index selection is based on real data present in the indices.

LDAP System

FIG. 1 is a block diagram that illustrates an example system 100 in which a client device 105 interacts with an LDAP server 110 in order to retrieve search results from an LDAP directory 115, according to various embodiments. Examples of client device 105 include, without restriction, a workstation, personal computer (PC), laptop computer, smart phone, wearable computer, or other networked electronic device. An interface presented at device 105 may be accessible using an application, e.g., client application 120 executing on device 105. In system 100, the LDAP directory 115 is communicatively coupled to the LDAP server 110, which is communicatively coupled to a communication network 125, to which the client device 105 is also communicatively coupled. Examples of communication networks may include a mobile network, a wireless network, a cellular network, a local area network (LAN), a wide area network (WAN), other wireless communication networks, or combinations thereof. Thus, a user can use the interface of the client application 120 to interact with the LDAP server 110 by sending LDAP operations to, and receiving LDAP search results from, the LDAP server 110 over communication network 125. In response to receiving an LDAP operation from the client application 120, the LDAP server 110 executes that operation relative to the LDAP directory 115 in order to retrieve search results from LDAP directory 115, which LDAP server 110 then returns to client application 120 over communication network 125.

According to various embodiments, the client application 120 can specify an LDAP search operation. A search operation can be used to retrieve partial or complete copies of entries matching a given set of criteria. The elements of an LDAP search request may include a search base such as an entry's distinguished name, often referred to as a DN. The DN uniquely identifies an entry and its position in the directory information tree (DIT) hierarchy. The DN of an LDAP entry is much like the path to a file on a file system. The LDAP search request may further include a search scope. The search scope specifies the portion of the target subtree that should be considered. Supported search scope values may include, for example, baseObject (indicates that only the entry specified as the search base should be considered), singleLeve (indicates that only the immediate children of the entry specified as the search base should be considered), wholeSubstree (indicates that the entry specified as the search base, and all of its subordinates to any depth, should be considered), and suboridnateSubtree (indicates that the entry specified by the search base should not be considered, but all of its subordinates to any depth should be considered. The LDAP search request may further include a filter for the search. The filter specifies criteria to use to identify which entries within the scope should be returned. In some embodiments, an LDAP search request includes other parameters such as a size limit for the search, a time limit for the search, a typeOnly flag, and a set of attributes to request for inclusion in entries that match the search criteria and are returned to the client device 105.

In various embodiments, the client application 120 can send, to the LDAP server 110, an LDAP search operation that specifies search criteria including one or more parameters such as a search base, a search scope, and a search filter. In some embodiments, the receipt of the LDAP search operation causes the LDAP server 110 to interpret these parameters in the following manner in its execution of the search operation relative to LDAP directory 115. The LDAP server 110 can interpret the value of the search base parameter to identify the particular LDAP directory entry at which the search operation is to be started. LDAP server 110 can interpret the value of the search scope parameter to identify the "depth," or the quantity of "levels," to which the LDAP directory entries are to be followed in compiling the search results. Put another way, LDAP server 110 can interpret the value of the scope parameter to identify the maximum number of "links" away from the base LDAP directory entry that LDAP server 110 is permitted to follow in compiling the search results. As used herein, "links" refers to relations that exist due to a reference in one LDAP entry to another LDAP entry; "links" does not refer to the hierarchical relationships between LDAP entries that inherently exist due to the LDAP directory's structure. LDAP server 110 can interpret the value of the search filter parameter to identify criteria that an LDAP directory entry should satisfy in order to be included in the search results. Thus, even if a particular LDAP directory entry falls within the specified search scope, that particular LDAP directory entry can be excluded from the search results if the values of that particular LDAP directory entry's attributes fail to satisfy the criteria that the search filter parameter specifies.

In some embodiments, upon or during interpretation of the parameters by the LDAP server 110, the LDAP server 110 selects indices that can be used to efficiently find entries matching the search criteria. An index maps a key to an entry ID list, which is the set of entry IDs for the entries that match that index key. The entry ID list is used as the value of a directory server index, and contains a set of entry IDs for all entries that match the associated index key. An entry ID is a value that is used to uniquely identify an entry in the LDAP directory 115. Although the entry's DN could be used for this purpose, normally the numeric entry ID is much more compact and more efficient to decode, so may be more appropriate for indexing. In some embodiments, the index is a key value pair, where the key is the attribute value or substring value that is indexed, and the value is the list of entry IDs matching that particular given value.

In some embodiments, when the LDAP server 110 receives a valid, authorized search operation, the LDAP server 110 executes the search operation relative to the LDAP directory 115 based on the interpreted search criteria and selected indices in order to identify any entries within the specified scope and that optionally match the given filter. All of those entries (or at least those that the user has permission to retrieve) will be returned to the client device 105 in search result entry messages. Each search result entry message will include the DN of the matching entry, along with zero or more of the attributes contained in that entry, based on the set of requested attributes from the search request and the set of attributes that the requester has permission to retrieve. If the search request had a typesOnly value of true, then those attributes will be returned without their values; otherwise the attributes will be returned with all values that the requester has permission to retrieve.

LDAP Query Optimization with Smart Index Selection

LDAP query performances in a directory server (e.g., the LDAP server 110 discussed with respect to FIG. 1) can be improved by optimizing the selection of the indices from the underlying storage layer. A directory server implementation is aware of how the underlying database (e.g., the LDAP directory 115) is structured and designed. By bringing in automatic statistic gathering for underlying deployment data within the directory server implementation, a directory server can intelligently select optimal indices to process LDAP queries based on the deployment data. Advantageously, the use of optimal indices would result in faster and more efficient processing of LDAP queries.

Figure 2:
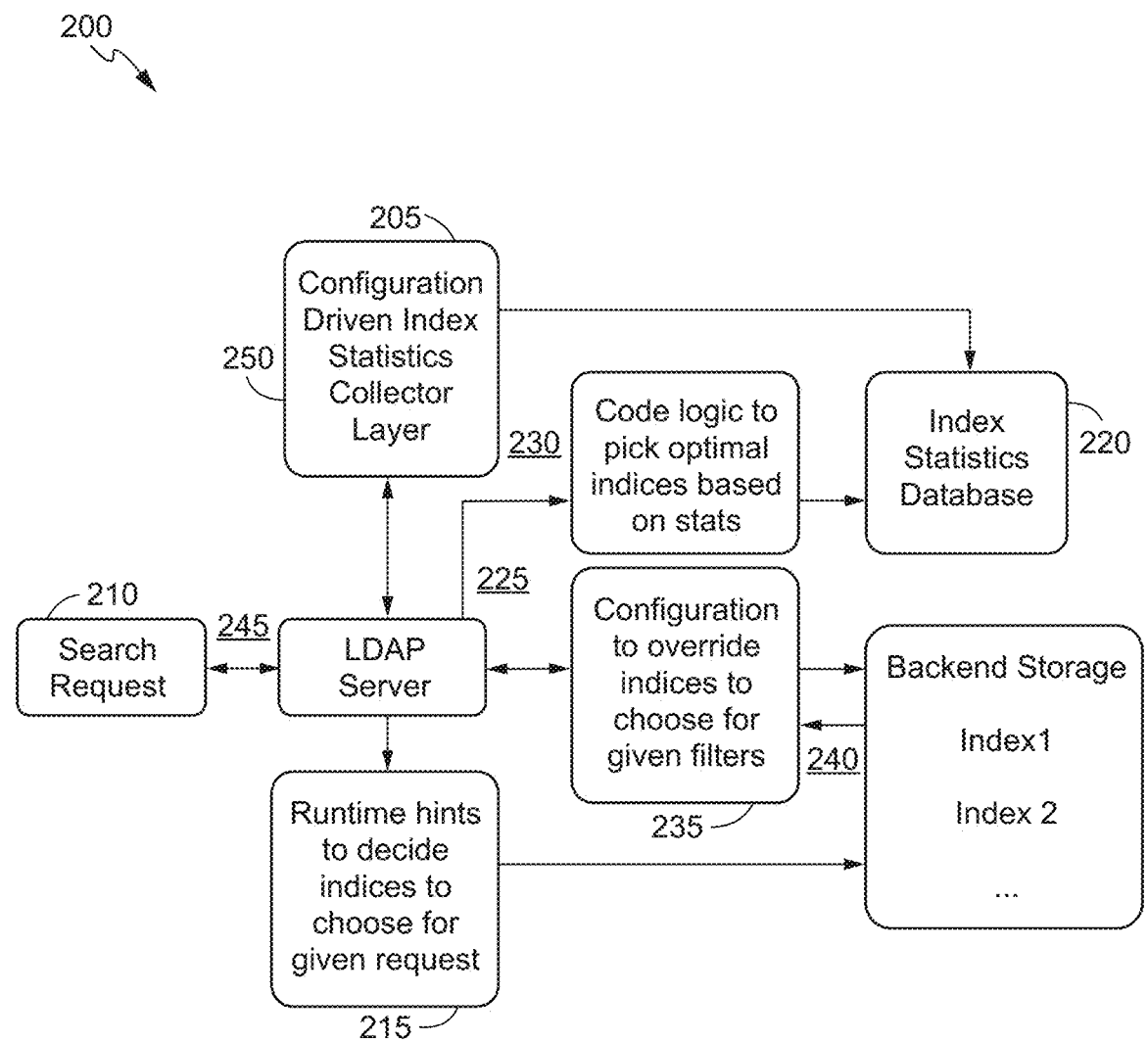
FIG. 2 shows a block diagram for collecting statistics and executing a LDAP search request based on the statistics in accordance with various embodiments.

In various embodiments, in order to select the optimal indices, the directory server collects statistics that are representative of the underlying deployment data. FIG. 2 shows a block diagram 200 of an LDAP framework for collecting statistics and executing a LDAP search request based on the statistics in accordance with various aspects. At step 205, the directory server collects index statistics based on the underlying deployment data. In some embodiments, the directory server includes a collection layer that is configured to collect the index statistics based on deployment level performance of directory indices. For example, the collection layer may be configured to collect index statistics during setup and/or during runtime based on performance of directory indices used to process queries in the LDAP directory. Typical directory indices are a key value pair, where the key is the attribute value or substring value that is indexed, and the value is the list of entry IDs matching the attribute value or the substring value. In certain embodiments, each entry ID is 8 bytes. As shown in Index Example (1), an attribute value "person" is 6 bytes and the list of entry IDs matching attribute value "person" contains 15 entries or 120 bytes of data (15×8=120 bytes); whereas an attribute value "top" is 3 bytes and the list of entry IDs matching attribute value "top" contains 32 entries or 256 bytes of data (32×8=256 bytes).

Index Example (1)

Indexed Value (6 bytes): person
Entry ID List (120 bytes): 3 4 5 6 7 8 9 10 11 12 13 14 15 16 17
Indexed Value (3 bytes): top
Entry ID List (256 bytes): 1 2 3 4 5 6 7 8 9 10 11 12 13 14 15 16 17 18 19 20 21 22 23 24 25 26 27 28 29 30 31 32

Accordingly, in some embodiments, at a snap shot in time it is possible to obtain a value size of the index using present deployment data for the index. The value size is a statistical measure of the index. The deployment data may include the size of each entry ID (e.g., 8 bytes), the size of the key or attribute value (e.g., "person" is 6 bytes) used in the index, and the size of the number of entries in a list of entry IDs matching that particular given attribute value (e.g., attribute value "person" contains 15 entries or 120 bytes of data (15×8=120 bytes), as shown in Index Example (1). In some embodiments, the value size is the calculated total bytes of data for the number of entries in a list of entry IDs matching a particular given key (attribute value or substring value per key). In other embodiments, the value size is an actual count for the number of entries in a list of entry IDs matching a particular given key (attribute value or substring value per key). In alternative or additional embodiments, overtime it is possible to obtain an average value size in the index using present and historical deployment data for the index. In some embodiments, the average value size is the calculated average total bytes of data for the number of entries in a list of entry IDs matching a particular given key (attribute value or substring value per key). In other embodiments, the average value size is average count for the number of entries in a list of entry IDs matching a particular given key (attribute value or substring value per key).

The larger the value size or average value size, the greater the number of entries that would be matched while executing a query using that index. Therefore, to execute a query optimally, a candidate index should have a smaller or smallest value size or average value size per key in index. In order to pick the right indices, the directory server is configured to decide which indices to use based on these statistics. For example, (objectclass=inetorgperson) (uid=tuserl) is an extremely common query requested from clients during authentication. Conventionally, the query would be performed by first executing the query using the objectcalss index to obtain a subset of entries and secondly executing the query on the subset of entries using the uid index. The terms (objectclass=inetorgperson) match nearly all entries in a typical directory, and thus, objectclass is not an efficient index for such a query (e.g., especially being used as an initial filter). However, with smart index selection, such a query would not be executed using the objectcalss index, and instead would be initially executed using the uid index (uid is unique for each user), and will be optimal, as the index provides an exact match resulting in a single entry.

In various embodiments, the directory server is configured to maintain and store index statistics internally. In some embodiments, the statistics collected for each index currently or overtime may be stored in an index statistics table or database (same or different database from the backend storage, e.g., the LDAP directory 115). Moreover, since finding the index data size or count of an index table can be an expensive operation, an index stats analyzer thread can be introduced for the directory server to run periodically based on configuration to update the statistics stored in the index statistics table or database. A command to gather stats on an as need basis may also be provided for the directory server. In some embodiments, the statistics can be automatically collected when re-indexing is performed. In additional or alternative embodiments, an index stats analyzer can rely on a directory changelog to gather index statistics periodically.

At step 210, a search request or operation may be received by the directory server. In some embodiments, the search request is received from one or more client devices. In some embodiments, the search request specifies search criteria including one or more parameters such as a search base, a search scope, and a search filter. At step 215, the receipt of the search request causes the directory server to interpret the one or more parameters manner in its execution of the search operation relative to the directory (e.g., the LDAP directory 115). For example, the directory server can interpret the value of the search base parameter to identify the particular directory entry at which the search operation is to be started. Additionally, the directory server can interpret the value of the search filter parameter to identify criteria that a directory entry should satisfy in order to be included in the search results. In various embodiments, the interpretation of the one or more parameters includes the directory server identifying one or more potential index candidates that can be used to efficiently find entries matching the search criteria. In some embodiments, the directory server uses hints to identify the one or more potential index candidates. In certain embodiments, the hints are obtained from the one or more parameters. For example, the hints may be obtained from the search filter parameter(s). When there are multiple index candidates identified, a list or table may be compiled of the identified multiple index candidates.

At step 220, the directory server obtains statistics for each index candidate identified in step 215. In some embodiments, the statistics are obtained from the statistics collected for each index currently or overtime, which were stored in the index statistics table or database at step 205. In some embodiments, the statistics are propagated, respectively, into the list or table compiled of the identified multiple index candidates. In certain embodiments, the statistics for each identified index candidate include the value size or the average value size (bytes of data for the number of entries in a list of entry IDs matching that particular given attribute value) per key (attribute value) in the index. At step 225, the directory server sorts the identified index candidates based on the obtained statistics. In some embodiments, the directory server comprises a comparator configured to compare each of the identified index candidates based on the obtained statistics and sort in accordance with one or more functions. In some embodiments, the sorting by one or more functions results in a single level sort. In other embodiments, the sorting by the one or more functions results in multiple levels of sorting. In certain embodiments, the one or more functions include an ascending or descending function. For example, the identified index candidates may be sorted in ascending or descending order based on their corresponding value size or average value size.

At step 230, the directory server selects one or more indices from the sorted index candidates to be used in its execution of the search operation relative to the directory. In various embodiments, the directory server selects the one or more indices from the sorted index candidates based on the statistics and the one or more functions used to sort the index candidates. For example, the index candidates with the smallest value size or average value size may be selected as the one or more indices. The larger the value size or average value size, the greater the number of entries that would be matched while executing a query using that index. Therefore, to execute a query optimally, a candidate index should have a smaller or smallest value size or average value size per key in index. At step 235, the directory server executes the search operation relative to the directory using at least the selected one or more indices. At step 240, the directory server obtains results of the search operation from the directory. In some embodiments, the results of the search operation include a number of entries that satisfy the selected indices. At step 245, the directory server returns, to the client, as a search result, a set of entries, assuming that the set of entries satisfy the search criteria, for example, are within the specified scope and satisfy the specified filter. Optionally, at step 250, the collector layer may update the statistics for the selected indices stored in the index statistics table or database based on the results of the search operation obtained from the directory.

Methods for LDAP Query Optimization with Smart Index Selection

Figure 3:
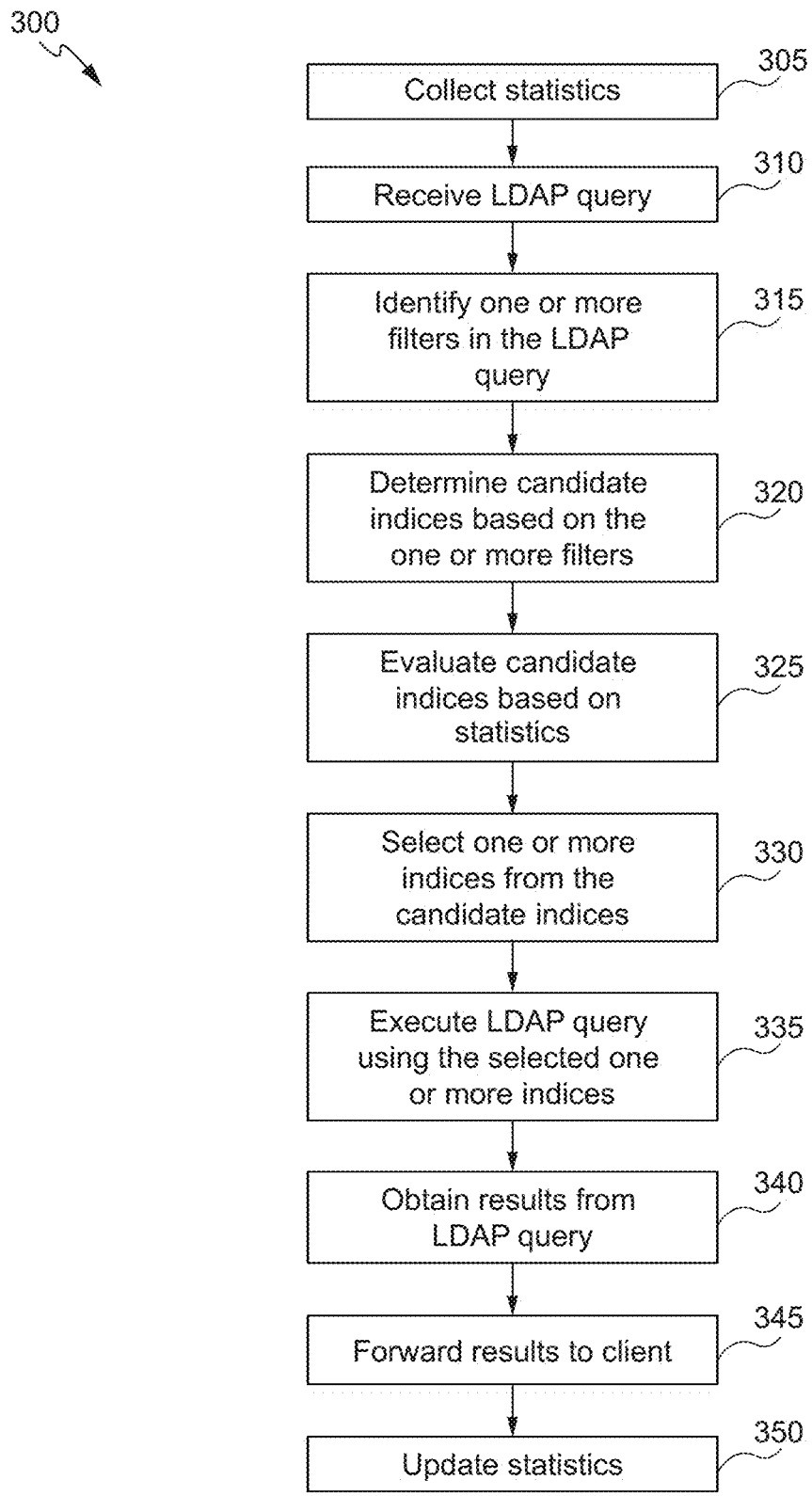
FIG. 3 depicts a LDAP search request process in accordance with various embodiments.

FIG. 3 illustrates a process and operation for smart index selection according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3 is not intended to be limiting. Other sequences of steps may also be performed according to alternative embodiments. For example, in alternative embodiments the steps outlined above may be performed in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a process for smart index selection according to various embodiments. In some embodiments, the processes depicted in flowchart 300 may be implemented by the system of FIG. 1 and the framework of FIG. 2. At step 305, statistics concerning indices used to service LDAP queries are collected by a data processing system such as directory server (e.g., the LDAP server 110 described with respect to FIG. 1). In some embodiments, the statistics for the candidate indices are collected, where the statistics include an average value size, which is a calculated average total bytes of data or average count for a number of entries in the list of entry IDs matching the attribute value or the substring value. In other embodiments, the statistics for the candidate indices are collected, where the statistics include a value size, which is a calculated total bytes of data or count for a number of entries in the list of entry IDs matching the attribute value or the substring value. In some embodiments, the statistics collected for each index are stored in an index statistics table or database. At step 310, a LDAP query comprising search criteria is received by the data processing system. In some embodiments, the LDAP query is received from a client. In some embodiments, the search criteria includes one or more parameters such as a search base, a search scope, and a search filter. At step 315, one or more search filters are identified by the data processing system within the search criteria. The data processing system can interpret the value(s) of the one or more search filters to identify criteria that an LDAP directory entry should satisfy in order to be included in the search results.

At step 320, candidate indices are determined by the data processing system based on the identified one or more search filters. Each of the candidate indices are a key value pair, where the key is an attribute value or substring value that is indexed, and the value is a list of entry IDs matching the attribute value or the substring value. In some embodiments, the determining the candidate indices comprises identifying one or more attribute values or substring values in the one or more search filters and matching the one or more attribute values or substring values to the candidate indices. At step 325, the candidate indices are evaluated by the data processing system based on statistics collected for the candidate indices. In some embodiments, the evaluating comprises: (i) obtaining statistics for the candidate indices, (ii) sorting the candidate indices based on the calculated average total bytes of data or the average count for each of the candidate indices, and (ii) comparing the candidate indices based on the calculated average total bytes of data or the average count for each of the candidate indices. In certain embodiments, the candidate indices are obtained from the collected indices and sorted in ascending or descending order.

At step 330, one or more indices from the candidate indices are selected by the data processing system based on the evaluating. In some embodiments, the selecting comprises selecting the one or more indices with the smallest calculated average total bytes of data or average count for each of the candidate indices. In other embodiments, the selecting comprises selecting the one or more indices with the smallest calculated total bytes of data or count for each of the candidate indices. In some embodiments, the one or more indices from the candidate indices are selected by the data processing system based on the evaluating and a type of the candidate indices. For example, exact match indices may be chosen over substring indices since the exact match indices are faster to evaluate. At step 335, the LDAP query is execute by the data processing system on an LDAP directory using the selected one or more indices. At step 340, results for the LDAP query based on the executing the LDAP query are obtained by the data processing system. The results may include one or more entries from the LDAP directory. At step 345, the results are sent or forwarded by the data processing system to a client. At step 350, the statistics concerning the indices used to service the LDAP queries are update by the data processing system based on the results obtained for the LDAP query.

Examples

Without intending to limit the scope of the embodiments discussed herein, the systems and methods implemented in various embodiments may be better understood by referring to the following examples.

Oracle's Unified Directory (OUD) ldapsearch CLI and searchrate performance monitoring tool (https://docs.oracle.com/cd/E 19199-01/816-6400-10/srchrate.html) were used to run the following queries to measure the results. OUD ldapsearch exposes a debugging flag "debugsearchindex" that lists which indices were evaluated.

searchrate output displays the following.

Avg=average number of operations per thread during the interval (the total divided by the number of threads).

rate in parentheses=is the average number of searches per second for all threads (the total divided by the number of seconds in the interval).

total=number of search operations completed by all threads during the full interval.

Case 1

Query: Search for the user with user id "drose" in locality Sunnyvale.

Filter used: "(&(l=Sunnyvale)(uid=drose))" city will map to a lot of entries then filter based on user Existing OUD code would evaluate both 1 and uid indices as the OUD does not typically contain any stats about the data indices. Results from existing code are below.

/ldapsearch -p 38959 -D cn=dirmgr -w perftestPW123 -b "dc=example,dc=com"-s sub "(&(l=sunnyvale) (uid=drose))" d ebugsearchindex dn: cn=debugsearch debugsearchindex: filter=(&(l=sunnyvale)[INDEX:1. equality] [COUNT: 30039](uid=drose)[INDEX:uid. equality] [COUNT:1]) [COUNT:1] final=[COUNT:1]

Searchrate Output:

./searchrate -p 38959 -D cn=dirmgr -w perftestPW123 -b 'dc=example,dc=com' -s sub -f "(&(l=sunnyvale)(uid=drose))"-r 100 -K Avg r=1464.00/thr (292.80/sec), total=1464
Avg r=2523.00/thr (504.60/sec), total=2523
Avg r=3189.00/thr (637.80/sec), total=3189
Avg r=3566.00/thr (713.20/sec), total=3566
Avg r=4023.00/thr (804.60/sec), total=4023
Avg r=4202.00/thr (840.40/sec), total=4202

Results with LDAP code and systems in accordance with various embodiments:

Same query is run with the revised LDAP code and system based on statistics. Below are the results.

[htanaya@slc12amj bin]$ ./ldapsearch -p 38959 -D cn=dirmgr -w perftestPW123 -b "dc=example,dc=com"-s sub "(&(l=sunnyvale)(uid=drose))" debugsearchindex dn: cn=debugsearch debugsearchindex: filter=(&(uid=drose)[INDEX:uid.equality] [COUNT:1])[COUNT: 1] final=[COUNT: 1]

As highlighted above, the revised LDAP code and system only evaluates uid index using an intelligent selection of the index based on statistics. Below is the searchrate output, and the revised LDAP system shows improved performance.

/searchrate -p 38959 -D cn=dirmgr -w perftestPW123 -b 'dc=example,dc=com' -s sub -f "(&(l=sunnyvale) (uid=drose))"-K Avg r=2389.00/thr (477.80/sec), total=2389
Avg r=4348.00/thr (869.60/sec), total=4348
Avg r=5558.00/thr (1111.60/sec), total=5558
Avg r=6724.00/thr (1344.80/sec), total=6724
Avg r=6935.00/thr (1387.00/sec), total=6935
Avg r=6928.00/thr (1385.60/sec), total=6928

Figure 4A:
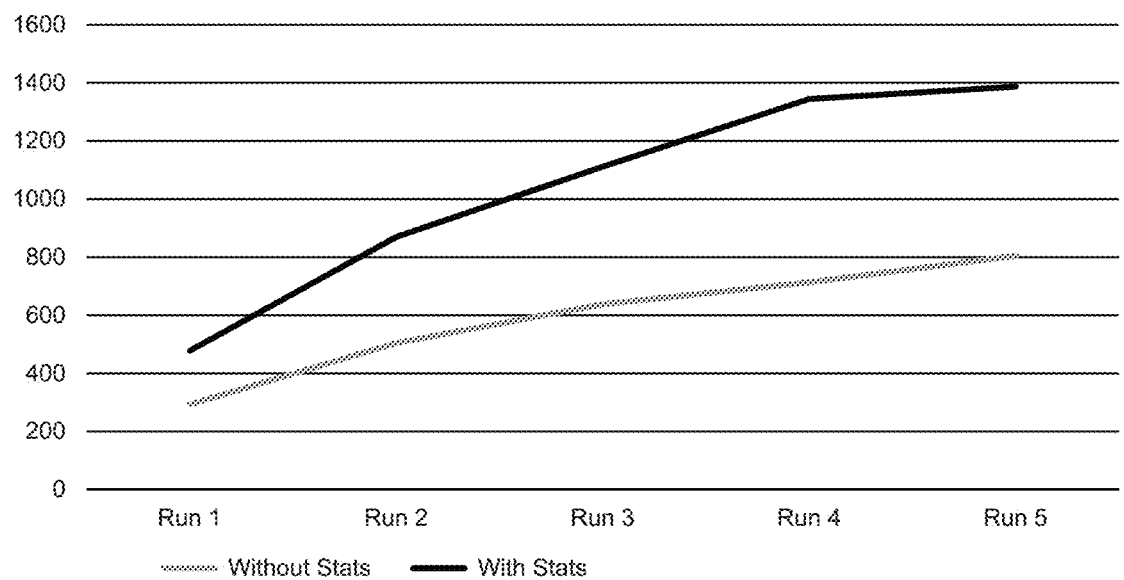
FIGS. 4A, 4B, and 4C depict graphs that show improvement in query processing between query operations performed with and without statistics in accordance with various embodiments.

The graph in FIG. 4A shows the comparison of the throughputs (number of operations per second for 5 of the above search rate runs) for the results without statistics and with statistics.

Case 2

Query: Search for the user with user id "user10000" in locality Sunnyvale with title "Software Engr".

Filter used: "(&(l=Sunnyvale)(title=Software Engr) (uid=user10000))"

Existing Code:

/ldapsearch -p 38959 -D cn=dirmgr -w perftestPW123 -b "dc=example,dc=com"-s sub "(&(l=Sunnyvale)(title=Software Engr)(uid=user10000))" debugsearchindex dn: cn=debugsearch debugsearchindex: filter=(&(l=Sunnyvale) [INDEX: 1.equality] [COUNT:30039](title=Software Engr)[INDEX: title.equality] [COUNT:20001](uid=user10000)[INDEX: uid.equality] [COUNT: 1]) [COUNT: 1] final=[COUNT:1]

Above shows that existing OUD code evaluated three indices. Below is the searchrate output.

[htanaya@slc12amj bin]$ ./searchrate -p 38959 -D cn=dirmgr -w perftestPW123 -b 'dc=example,dc=com' -s sub -f "(&(l=Sunnyvale)(title=Software Engr) (uid=user10000))" -K Avg r=1143.00/thr (228.60/sec), total=1143
Avg r=1838.00/thr (367.60/sec), total=1838
Avg r=2265.00/thr (453.00/sec), total=2265
Avg r=2452.00/thr (490.40/sec), total=2452
Avg r=2633.00/thr (526.60/sec), total=2633
Avg r=2658.00/thr (531.60/sec), total=2658

Results with the revised LDAP code and system in accordance with various embodiments.

Same query is run with the revised LDAP code and system. Below are the results.

/ldapsearch -p 38959 -D cn=dirmgr -w perftestPW123 -b "dc=example,dc=com"-s sub "(&(l=Sunnyvale) (title=Software Engr)(uid=user10000))" debugsearchindex dn: cn=debugsearch debugsearchindex: filter=(&(uid=user10000)[INDEX:uid-.equality][COUNT:1])[COUNT:1] final=[COUNT:1]

As highlighted above, the revised LDAP code and system only evaluates uid index. Below is the searchrate output, and the revised LDAP system shows improved performance.

[htanaya@slc12amj bin]$ ./searchrate -p 38959 -D cn=dirmgr -w perftestPW123 -b 'dc=example,dc=com' -s sub -f "(&(l=Sunnyvale)(title=Software Engr) (uid=user10000))"-K Avg r=2393.00/thr (478.60/sec), total=2393
Avg r=4061.00/thr (812.20/sec), total=4061
Avg r=5448.00/thr (1089.60/sec), total=5448
Avg r=7003.00/thr (1400.60/sec), total=7003
Avg r=6904.00/thr (1380.80/sec), total=6904

Figure 4B:
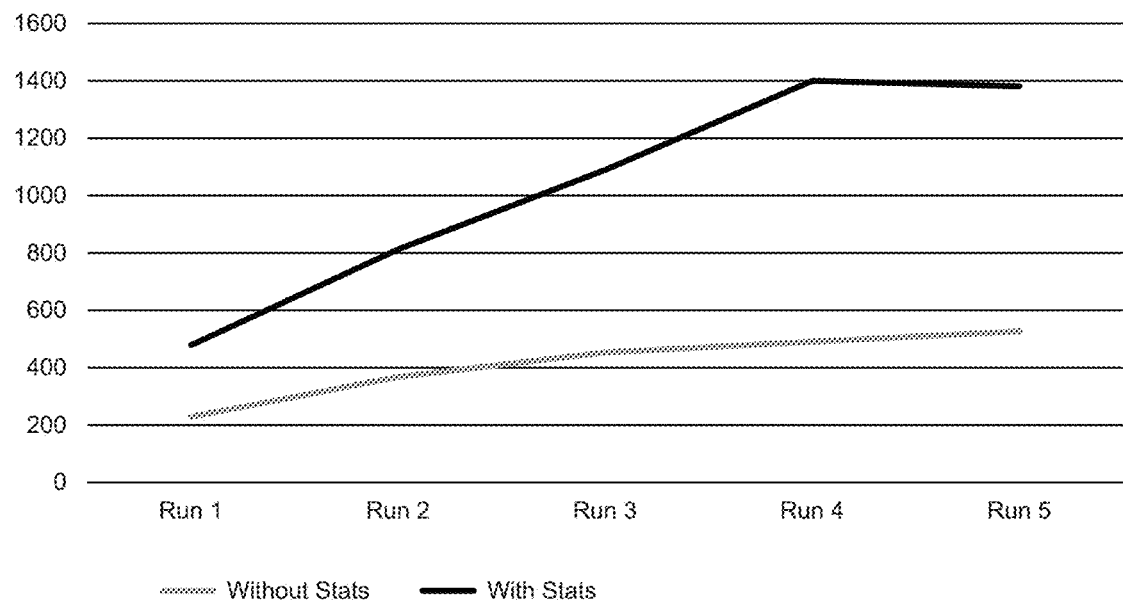

The graph in FIG. 4B shows the comparison of the throughputs (number of operations per second for 5 of the above search rate runs) for the results without statistics and with statistics.

Case 3

Query: Search for users with last name Smith, in locality name starting with "Santa", job title containing value "Software Engr", and having a phonenumber present in the directory.

Filter used: "&(telephonenumber=*)(title=Software Engr*)(l=Santa*)(sn=smith)"

Existing Code:
```
./ldapsearch -p 38959 -D cn=dirmgr -w perftestPW123 -b
"ou=people,dc=example,dc=com"-s sub "&(telephonenum-
ber=*)(l=Santa*)(title=Software       Engr*)(sn=smith)"
debugsearchindex
dn: cn=debugsearch
debugsearchindex:
filter=(&(telephoneNumber=*)[INDEX:telephoneNumber-
.presence] [COUNT:60150](sn=smith) [INDEX: sn.equal-
ity] [COUNT: 13](l=Santa*)[INDEX:l.substring]
[COUNT:    86](title=SoftwareEngr*)[INDEX:title.    sub-
string] [COUNT:20014])[COUNT:11] scope=sub [LIMIT-
EXCEEDED:100152] final=[COUNT:11]
```

Above shows that existing OUD code evaluated all possible indices. Below is the searchrate output.

```
htanaya@slc12amj bin]$ ./searchrate -p 38959 -D
cn=dirmgr -w perftestPW123 -b 'dc=example,dc=com' -s
sub -f "(&(telephonenumber=*)(l=Santa*)(title=Software
Engr*)(sn=smith))"
Avg r=452.00/thr (90.40/sec), total=352
Avg r=676.00/thr (135.20/sec), total=676
Avg r=795.00/thr (159.00/sec), total=795
Avg r=849.00/thr (169.80/sec), total=849
Avg r=893.00/thr (178.60/sec), total=893
Avg r=841.00/thr (168.20/sec), total=841
```

Results with the revised LDAP code and system in accordance with various embodiments.
Same query is run with the revised LDAP code and system. Below are the results.

```
[htanaya@slc12amj bin]$ ./ldapsearch -p 38959 -D
cn=dirmgr -w perftestPW123 -b "ou=people, dc=example,
dc=com"-s   sub    "&(telephonenumber=*)(l=Santa*)
(title=Software Engr*)(sn=smith)" debugsearchindex
dn: cn=debugsearch
debugsearchindex:  filter=(&(sn=smith)[INDEX:sn.equal-
ity][COUNT:13])[COUNT:13] final=[COUNT:13]
```

As highlighted above, the revised LDAP code and system only evaluates sn index. Below is the searchrate output, it shows improved performance.

```
Avg r=550.00/thr (110.00/sec), total=550
Avg r=1047.00/thr (209.40/sec), total=1047
Avg r=1283.00/thr (256.60/sec), total=1283
Avg r=1361.00/thr (272.20/sec), total=1361
Avg r=1462.00/thr (292.40/sec), total=1462
Avg r=1568.00/thr (313.60/sec), total=1568
```

Figure 4C:
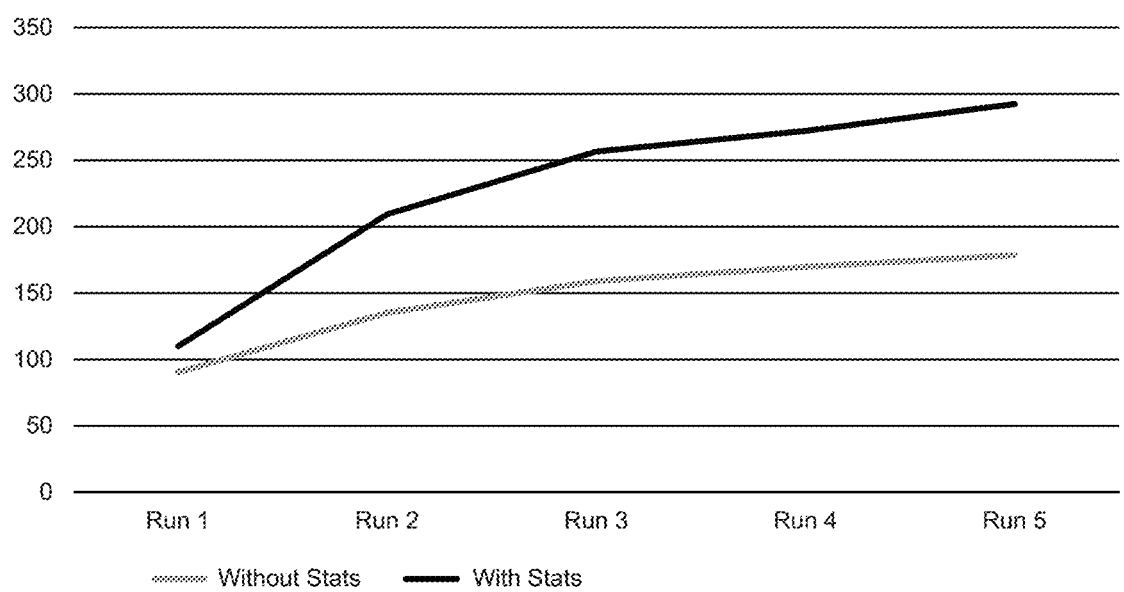

The graph in FIG. 4C shows the comparison of the throughputs (number of operations per second for 5 of the above search rate runs) for the results without statistics and with statistics.

The result from above cases confirms the fact that collecting stats about indices can improve the LDAP server's decision making process to pick correct indices. This internally speeds up complex queries as less data is fetched and results in improved query performance.

Computing Environments

Figure 5:
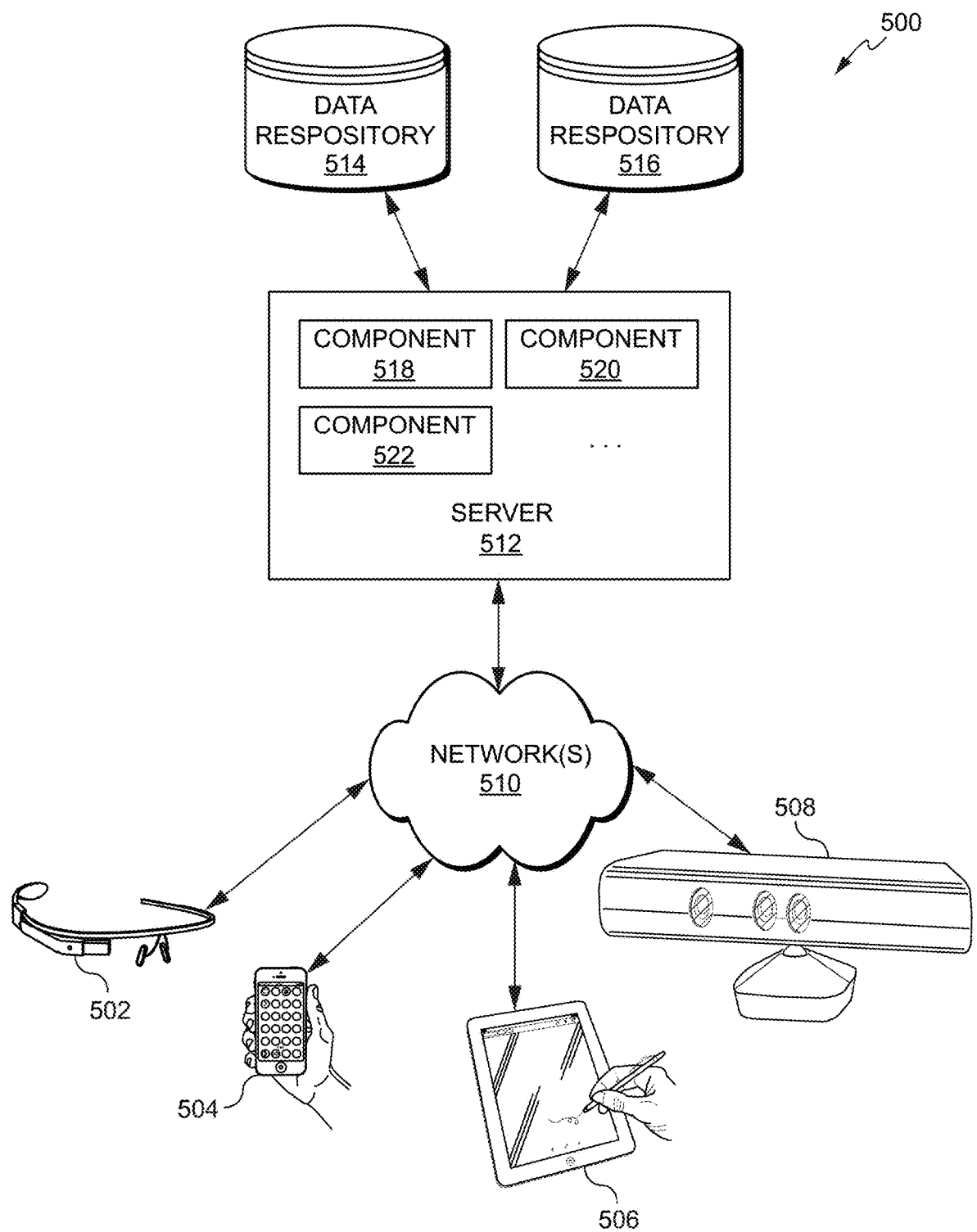
FIG. 5 depicts a simplified block diagram of a distributed system that may be used to implement various embodiments of the present disclosure.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable improved query performance on an LDAP server.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to improved query performance on an LDAP server in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for improving query performance on an LDAP server. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
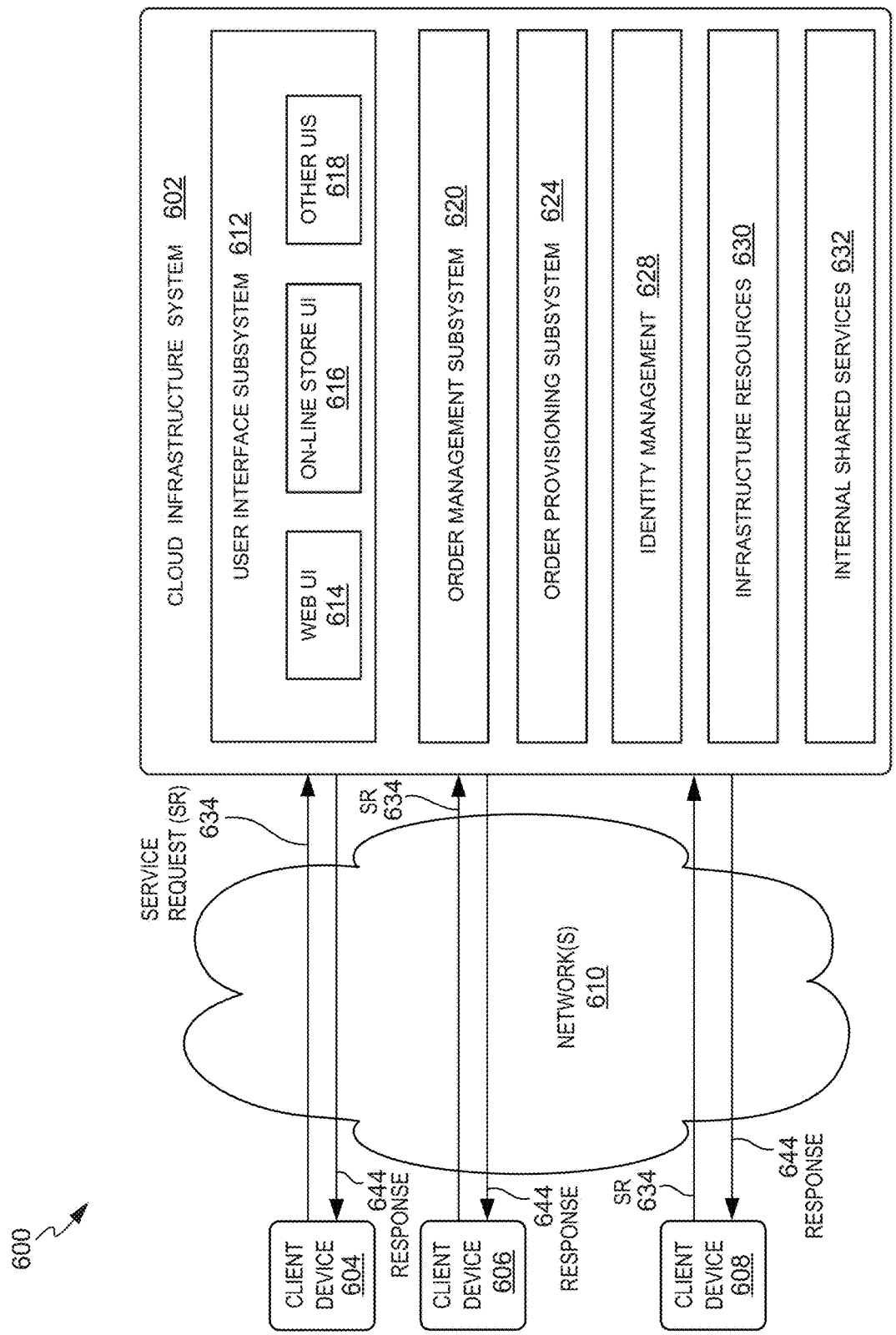
FIG. 6 depicts a simplified block diagram of one or more components of a system environment in which services may be offered as cloud services, in accordance with various embodiments.

In certain embodiments, the improved query performance on an LDAP server described in this disclosure may be offered as services via a cloud environment. FIG. 6 is a simplified block diagram of a cloud-based system environment in which the improved query performance on an LDAP server may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, improving query performance on an LDAP server using statistics. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request an improved query performance on an LDAP server described in this disclosure.

In some embodiments, the processing performed by cloud infrastructure system 602 for providing LDAP query services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for improving query performance on an LDAP server. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for an improved query performance service offered by cloud infrastructure system 602. As part of the order, the customer may provide information identifying complex and time-sensitive business scenarios to be solved.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting an improved query performance service, the response may include a notification that statistics have been collected for an improved query performance or the response may include results of a LDAP query.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
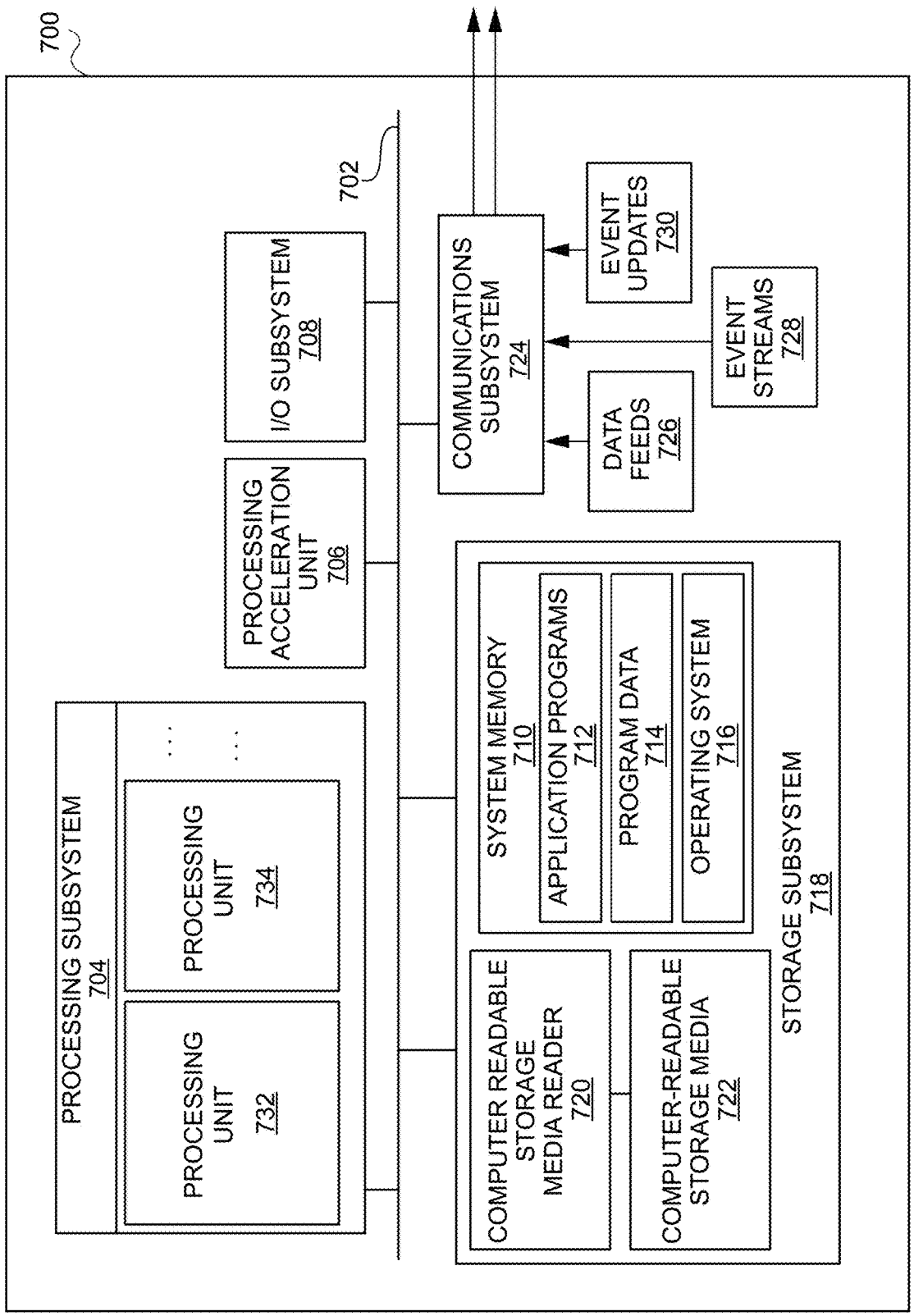
FIG. 7 depicts an exemplary computer system that may be used to implement various embodiments of the present disclosure.

FIG. 7 illustrates an exemplary computer system 700 that may be used to implement certain embodiments. For example, in some embodiments, computer system 700 may be used to implement any of the LDAP query processing systems, LDAP systems, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain statistics for improved query performance.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    collecting, by a data processing system, statistics for directory indices over a period of time during setup and/or during runtime based on performance of the directory indices used to process queries in a Lightweight Directory Access Protocol (LDAP) directory, wherein each of the directory indices are a key value pair, where the key is an attribute value or substring value that is indexed, and the value is a list of entry IDs matching the attribute value or the substring value, wherein the statistics include an average value size of the directory indices calculated using deployment data of the directory indices over the period of time, and the average value size is a calculated average total bytes of data for a number of entries in the list of entry IDs matching a particular given key over the period of time or a calculated average count for the number of entries in the list of entry IDs matching the particular given key over the period of time, and wherein the deployment data includes a size of each entry ID and a size of the number of entries in the list of entry IDs matching the attribute value or the substring value;
    receiving, by the data processing system, a LDAP query comprising search criteria;
    identifying, by the data processing system, one or more search filters within the search criteria;
    determining, by the data processing system, candidate indices based on the identified one or more search filters, wherein the determining the candidate indices comprises identifying one or more attribute values or substring values in the one or more search filters and matching the one or more attribute values or substring values to the candidate indices;
    evaluating, by the data processing system, the candidate indices based on the statistics collected for the directory indices that correspond to the candidate indices, wherein the evaluating comprises: (i) obtaining the statistics for the candidate indices, (ii) sorting the candidate indices based on the calculated average total bytes of data or the calculated average count for each of the candidate indices, and (iii) comparing the candidate indices based on the calculated average total bytes of data or the calculated average count for each of the candidate indices;
    selecting, by the data processing system, one or more indices from the candidate indices based on the evaluating and a type of the candidate indices; and
    executing, by the data processing system, the LDAP query on the LDAP directory using the selected one or more indices to find entries matching the search criteria.

2. The method of claim 1, further comprising:
    obtaining, by the data processing system, results for the LDAP query based on the executing the LDAP query, wherein the results include one or more entries from the LDAP directory; and
    forwarding, by the data processing system, the results to a client.

3. The method of claim 2, further comprising updating, by the data processing system, the statistics concerning the directory indices used to service the LDAP queries based on the results obtained for the LDAP query.

4. The method of claim 1, wherein the candidate indices are sorted in ascending or descending order, and the selecting comprises selecting the one or more indices with the smallest calculated average total bytes of data or average count for each of the candidate indices.

5. A system comprising:
    a Lightweight Directory Access Protocol (LDAP) system that includes one or more processors and non-transitory machine readable storage medium having instructions stored thereon that when executed by the one or more processors cause the one or more processors to perform a process comprising:
    collecting, by a LDAP server, statistics for directory indices over a period of time during setup and/or during runtime based on performance of the directory indices used to process queries in a LDAP directory, wherein each of the directory indices are a key value pair, where the key is an attribute value or substring value that is indexed, and the value is a list of entry IDs matching the attribute value or the substring value, wherein the statistics include an average value size of the directory indices calculated using deployment data of the directory indices over the period of time, and the average value size is a calculated average total bytes of data for a number of entries in the list of entry IDs matching a particular given key over the period of time or a calculated average count for the number of entries in the list of entry IDs matching the particular given key over the period of time, and wherein the deployment data includes a size of each entry ID and a size of the number of entries in the list of entry IDs matching the attribute value or the substring value;
    receiving, by the LDAP server, a LDAP query comprising search criteria;
    identifying, by the data processing system, one or more search filters within the search criteria;
    determining, by the LDAP server, candidate indices based on the identified one or more search filters, wherein the determining the candidate indices comprises identifying one or more attribute values or substring values in the one or more search filters and matching the one or more attribute values or substring values to the candidate indices;
    evaluating, by the LDAP server, the candidate indices based on the statistics collected for the directory indices that correspond to the candidate indices, wherein the evaluating comprises: (i) obtaining the statistics for the candidate indices, (ii) sorting the candidate indices based on the calculated average total bytes of data or the calculated average count for each of the candidate indices, and (iii) comparing the candidate indices based on the calculated average total bytes of data or the calculated average count for each of the candidate indices;

selecting, by the LDAP server, one or more indices from the candidate indices based on the evaluating and a type of the candidate indices; and executing, by the LDAP server, the LDAP query on the LDAP directory using the selected one or more indices to find entries matching the search criteria.

6. The system of claim 5, wherein the process further comprises:

obtaining, by the LDAP server, results for the LDAP query based on the executing the LDAP query, wherein the results include one or more entries from the LDAP directory; and forwarding, by the LDAP server, the results to a client.

7. The system of claim 6, wherein the process further comprises updating, by the LDAP server, the statistics concerning the directory indices used to service the LDAP queries based on the results obtained for the LDAP query.

8. The system of claim 5, wherein the candidate indices are sorted in ascending or descending order, and the selecting comprises selecting the one or more indices with the smallest calculated average total bytes of data or average count for each of the candidate indices.

9. A non-transitory machine readable storage medium having instructions stored thereon that when executed by one or more processors cause the one or more processors to perform a method comprising:

collecting, by a data processing system, statistics for directory indices over a period of time during setup and/or during runtime based on performance of the directory indices used to process queries in a Lightweight Directory Access Protocol (LDAP) directory, wherein each of the directory indices are a key value pair, where the key is an attribute value or substring value that is indexed, and the value is a list of entry IDs matching the attribute value or the substring value, wherein the statistics include an average value size of the directory indices calculated using deployment data of the directory indices over the period of time, and the average value size is a calculated average total bytes of data for a number of entries in the list of entry IDs matching a particular given key over the period of time or a calculated average count for the number of entries in the list of entry IDs matching the particular given key over the period of time, and wherein the deployment data includes a size of each entry ID and a size of the number of entries in the list of entry IDs matching the attribute value or the substring value;

receiving a LDAP query comprising search criteria;

identifying one or more search filters within the search criteria;

determining candidate indices based on the identified one or more search filters, wherein the determining the candidate indices comprises identifying one or more attribute values or substring values in the one or more search filters and matching the one or more attribute values or substring values to the candidate indices;

evaluating the candidate indices based on the statistics collected for the directory indices that correspond to the candidate indices, wherein the evaluating comprises: (i) obtaining the statistics for the candidate indices, (ii) sorting the candidate indices based on the calculated average total bytes of data or the calculated average count for each of the candidate indices, and (iii) comparing the candidate indices based on the calculated average total bytes of data or the calculated average count for each of the candidate indices;

selecting one or more indices from the candidate indices based on the evaluating and a type of the candidate indices; and executing the LDAP query on the LDAP directory using the selected one or more indices to find entries matching the search criteria.

10. The non-transitory machine readable storage medium of claim 9, wherein the process further comprises:

obtaining results for the LDAP query based on the executing the LDAP query, wherein the results include one or more entries from the LDAP directory;

forwarding the results to a client; and updating the statistics concerning the directory indices used to service the LDAP queries based on the results obtained for the LDAP query.

11. The non-transitory machine readable storage medium of claim 9, wherein the candidate indices are sorted in ascending or descending order, and the selecting comprises selecting the one or more indices with the smallest calculated average total bytes of data or average count for each of the candidate indices.

* * * * *

UNITED STATES PATENT AND TRADEMARK OFFICE
CERTIFICATE OF CORRECTION

PATENT NO. : 11,575,645 B2
APPLICATION NO. : 16/204525
DATED : February 7, 2023
INVENTOR(S) : Tanaya et al.

It is certified that error appears in the above-identified patent and that said Letters Patent is hereby corrected as shown below:

In the Drawings

On sheet 6 of 8, in FIG. 5, under Reference Numeral 514, Line 2, delete "RESPOSITORY" and insert -- REPOSITORY --, therefor.

On sheet 6 of 8, in FIG. 5, under Reference Numeral 516, Line 2, delete "RESPOSITORY" and insert -- REPOSITORY --, therefor.

In the Specification

In Column 7, Line 17, delete "singleLeve" and insert -- singleLevel --, therefor.

In Column 7, Line 21, delete "suboridnateSubtree" and insert -- subordinateSubtree --, therefor.

In Column 9, Line 46, delete "objectcalss" and insert -- objectclass --, therefor.

In Column 9, Lines 52-53, delete "objectcalss" and insert -- objectclass --, therefor.

In Column 13, Line 3, delete "E 19199" and insert -- E19199 --, therefor.

In Column 13, Line 31, delete "[INDEX:1" and insert -- [INDEX:l --, therefor.

In Column 14, Lines 16-17, delete "[INDEX:1" and insert -- [INDEX:l --, therefor.

In Column 15, Line 10, delete "(1" and insert -- (l --, therefor.

In Column 15, Line 10, delete "[INDEX:1" and insert -- [INDEX:l --, therefor.

Signed and Sealed this
Nineteenth Day of December, 2023

Katherine Kelly Vidal
*Director of the United States Patent and Trademark Office*

In Column 16, Line 61, delete "Internet" and insert -- Internetwork --, therefor.

In Column 16, Line 67, delete "infra-red" and insert -- infrared --, therefor.